United States Patent [19]
Cole

[11] Patent Number: 4,466,235
[45] Date of Patent: Aug. 21, 1984

[54] ROTARY MOWER

[76] Inventor: Denver C. Cole, Rte. 2, 108 Spring Creek Rd., Estill Springs, Tenn. 37330

[21] Appl. No.: 457,006

[22] Filed: Jan. 10, 1983

[51] Int. Cl.³ ............................................. A01D 35/26
[52] U.S. Cl. .................... 56/16.9; 56/17.5; 56/295; 56/320.2
[58] Field of Search ............... 56/255, 17.5, 320.1, 56/320.2, 12.8, 17.6, 16.9, 295

[56] References Cited
U.S. PATENT DOCUMENTS

| | | | |
|---|---|---|---|
| 2,578,880 | 12/1951 | Doyle | 56/255 |
| 2,664,685 | 1/1954 | Phelps | 56/255 |
| 3,100,371 | 8/1963 | Redmon | 56/255 |
| 3,496,707 | 2/1970 | Kobey | 56/17.5 |
| 3,601,960 | 8/1971 | Buechler | 56/320.2 |
| 3,716,089 | 2/1973 | Bateman | 56/12.8 |
| 4,378,668 | 4/1983 | Gullett | 56/255 |

Primary Examiner—J. N. Eskovitz
Attorney, Agent, or Firm—C. A. Phillips; Michael L. Hoelter

[57] ABSTRACT

A rotary mower wherein tall vegetation is cut by selectively exposing a front opening in the housing of the mower, which in turn exposes a portion of a rotating cutting blade.

1 Claim, 6 Drawing Figures

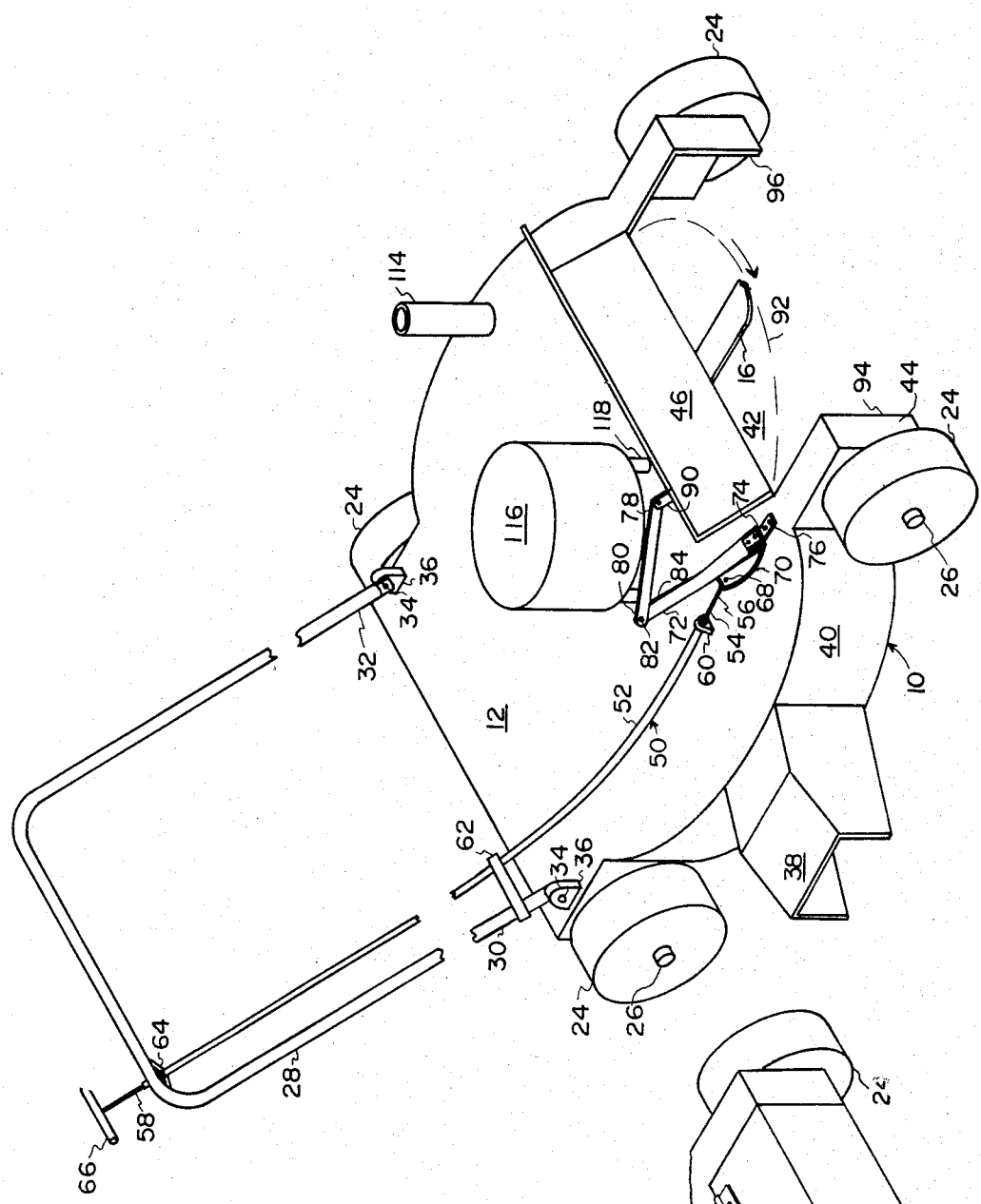
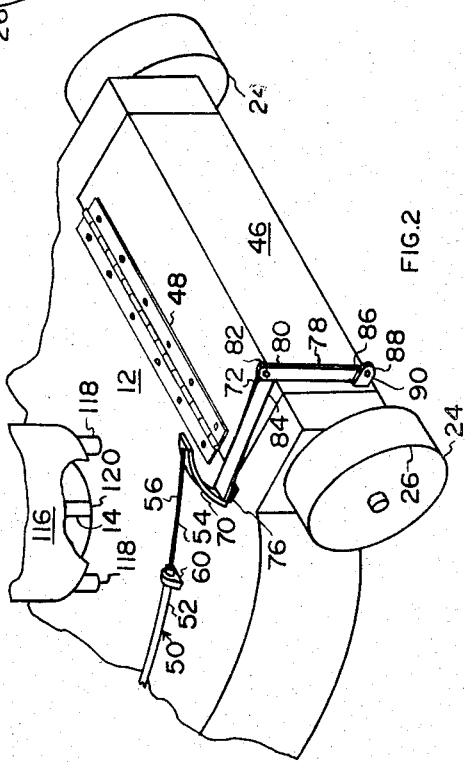
FIG.1
FIG.2

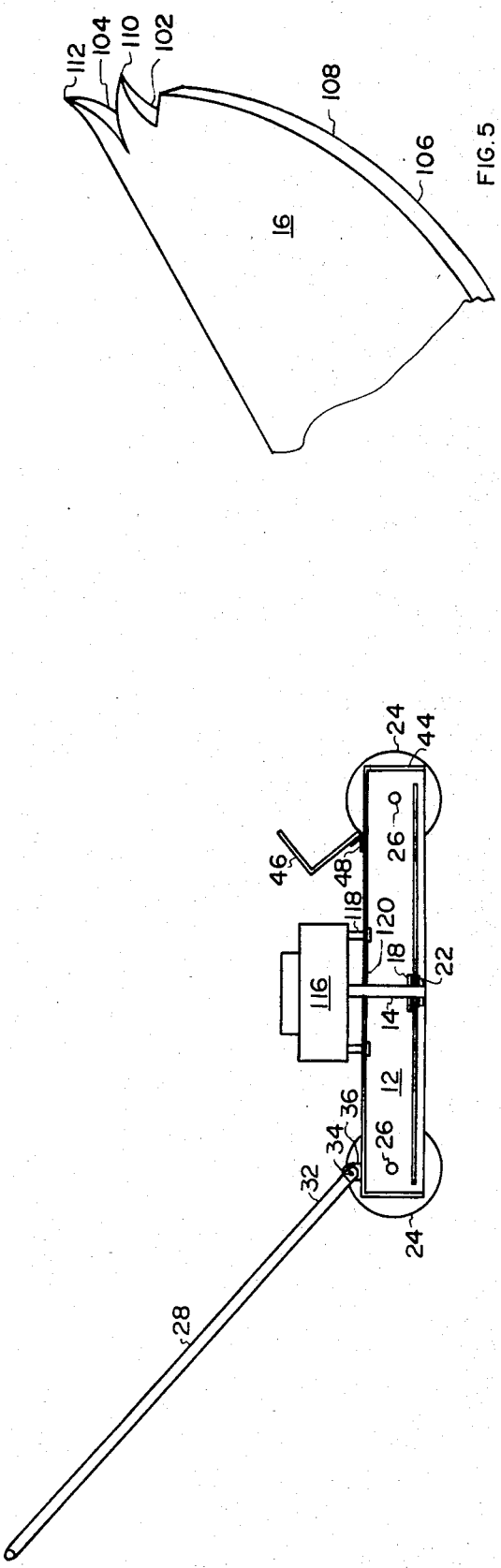

ROTARY MOWER

TECHNICAL FIELD

This invention relates generally to mowing machines, and particularly to rotary type mowers.

BACKGROUND ART

Rotary type mowers have largely taken over from the earlier reel type, and millions of such mowers, particularly of the lawn type, are in use. They quickly and efficiently mow through vegetation, grass and weeds, provided such is not too high. Where vegetation is significantly higher than the blade housing of the typical lawnmower, it must be pushed over for the mower to proceed. If the mower is manually propelled, this can require considerable effort and become a quite slow operation. The usual solution employed when one encounters high grass with a lawn mower is to pivot the front of the mower upward. This method is dangerous for two reasons. One, it involves raising the plane of movement of the cutting blade to an angle which tends to cause any foreign object struck by the blade to be hurled up, incurring increased risk of damage to person and property. Second, there is a tendency to lower a tilted mower back to a level position too rapidly and thereby not infrequently making a very abrupt contact with a foreign object. When this occurs, there is an increased likelihood of either the object being forcibly propelled from the mower or of damage to the mower, or both.

It is the object of this invention to provide a mower which will cut taller vegetation with less effort and without having to tilt the mower to do so.

SUMMARY OF THE INVENTION

In accordance with this invention, a rotary mower is constructed having a housing which is open in front. An openable shield is positioned over this opening, being supported on the housing by a hinge. A control cable, operable from a handlebar of the mower, is connected to the shield and enables the remote operation of the shield between open and closed positions.

BRIEF DESCRIPTION OF THE DRAWINGS

FIG. 1 is a pictorial view of an embodiment of the invention and illustrating a movable shield on the front of a mower in an open position.

FIG. 2 is a broken pictorial view of the mower shown in FIG. 1 with the shield in a closed position.

FIG. 3 is a view, partially in section, taken along line 3—3 of FIG. 1.

FIG. 4 is a pictorial view of a cutting blade as contemplated by this invention.

FIG. 5 is an enlarged pictorial view of one end region of the blade shown in FIG. 4.

FIG. 6 is a broken end view as seen along line 6—6 of FIG. 5.

DETAILED DESCRIPTION OF THE INVENTION

Referring to the drawings, rotary mower 10 is generally of conventional configuration. Thus, it includes a central housing 12 which supports a gasoline engine (diagrammatically illustrated) having a shaft 14 which extends vertically downward. Blade 16 is secured between two washers 18 and 20 to shaft 14 by a nut 22 threaded on shaft 14. Four wheels 24 are rotably supported on stub axles 26 attached at four corner regions of housing 12, and these enable mower 10 to be moved across a ground area and cut. Mower 10 is operated over the ground by a handlebar 28 which is U-shaped and is pivotally connected at its ends 30 and 32 by pins 34 and brackets 36 to housing 12. A conventional grass discharge chute 38 extends from side 40 of housing 12.

In contrast with conventional mowers, and as a feature of this invention, an opening 42 is formed in the front region of housing 12 and is formed by removing a portion of the front wall 44 and a portion of the adjoining top of housing 12. An L-shaped shield 46 is supported by hinge 48 on housing 12 and is sized and configured to cover the opening 42 created. Shield 46 is movably operated between covering and open positions by control assembly 50. Control assembly 50 employs an elongated flexible outer casing 52 and an inner cable 54 which extends beyond casing 52 at ends 56 and 58. Outer casing 52 is conventionally secured to housing 12 by a bracket 60 and is secured to U-shaped handlebar 28 by brackets 62 and 64. A handle 66 is secured to end 58 of cable 54 to enable convenient controlled movement of cable 54 through casing 52. The opposite end 56 of cable 54 projects through an opening 68 in arm 70 of control lever assembly 50. A main arm 72 of control lever assembly 50 from which arm 70 extends is pivotally attached via a pin 74 and bracket 76 on housing 12. A third arm 78 is pivotally attached at one end 80 by pin 82 to end 84 of main arm 72, and the opposite end 86 of third arm 78 is pivotally attached through pin 88 and bracket 90 to a lower portion of an end of shield 46.

FIG. 1 illustrates an open mode for shield 46, and it is moved to this position by the retraction of cable 54, this being effected by an operator pulling on handle 66. When shield 46 is open, opening 42 extends within cutting circle 92 of blade 16. Thus, grass or weeds in the path of mower 10 between opening edges 94 and 96 is not deflected over by the front housing of the mower as in the conventional case, but remains standing straight until engaged and cut by blade 16. Typically, shield 46 is opened when the vegetation encountered is higher than the front elevation of housing 12. This taller vegetation would otherwise provide a significant barrier for the free movement of the mower and require a considerable effort on the part of an operator to move the mower along. Accordingly, by raising shield 46 and thereby allowing mower 10 to freely cut the vegetation, this moving problem is effectively eliminated.

FIG. 2 illustrates shield 46 in a lowered or covering position, this being effected by the movement of end 56 of cable 54 outward. This is the normal operating position of mower 10 when employed to cut vegetation which is not particularly high.

A second feature of this invention is particularly illustrated in FIGS. 4-6 wherein the opposite ends 98 and 100 of cutting blade 16 each has a pair of notches 102 and 104. These notches are V-shaped, and each pair 102 and 104 is formed in the curved leading edge region 106 of opposite ends of cutting blade 16. These ends of cutting blade 16 are tapered to provide a cutting edge 108 positioned along the bottom edge of cutting blade 16. Notches 102 and 104 are adjacent to two pointed teeth 110 and 112, as particularly shown in FIG. 6. Front tooth 110 is turned down and rear tooth 112 is turned up, typically each at an angle of approximately 15° to 35° with respect to the general plane of blade 16. The teeth are sharpened by removing material from the upper side of each tooth in a tapered fashion so that the ends of the teeth come to a point. Adjacent pointed teeth 110 and 112 at each end of blade 16 impart a sawing action to vegetation struck by the blade, thereby enhancing the cutting effect and making it possible to cut significantly larger diameter vegetation than normally would be the case. For example, one can actually cut small diameter brush and quite thick diameter weeds.

Coordinate with the enhanced cutting capacity, and as a further feature of this invention, a mulching chute 114 is secured to housing 12 immediately above a cutting circle for teeth 110 and 112. This mulching chute is tubular and has an inner diameter typically approximately 2½ inches to accommodate weeds or corn stalks which can be readily and safely accommodated by the blade and engine, that is, will not suddenly stall the engine. Three-quarters inch brush fed into mower 10 in this manner is typically cut into small chunks, which may approximate shreader chips. During this operation, typically a cover (not shown) conventionally attached to discharge chute 38 would be closed to enhance the mulching operation and prevent the discharge of the saw dust. While it is normally not necessary, if desired, a cover (not shown) may be placed over the upper end of mulching chute 114.

As a still further feature of this invention, engine 116 is supported ⅛ to one inch above housing 12 by a plurality of equally spaced supports 118 positioned around and under engine 116. They are identical in height and are mounted between the bottom surface of engine 116 and the top surface of housing 12 and typically comprise a bushing through which a bolt extends from the underside of housing 12 and threads into and secures engine 116 to housing 12. By this elevation of the engine, and an opening 120 around engine shaft 14 (FIG. 2), air will flow downward under engine 116 through opening 120 and out underneath housing 12. This air circulation provides increased cooling for engine 116 and thereby improves operating conditions for the engine. This effect is particularly beneficial where mower 10 is being operated in high grass or at fairly high over-the-ground speeds in which mower 10 may become overloaded or overheated. While the power source is derived as a gasoline engine, an electric mower may aslo be employed.

From the foregoing, it is to be appreciated that the applicant has provided a mower with enhanced capabilities. Significantly, he has provided a mower in which tall vegetation is not pushed over before being engaged by the blade of the mower, and in this way, the movement of the mower over the ground is almost as easy with tall vegetation as with low vegetation. His mower eliminates the need for the rather hazardous practice of tilting a mower upward to cut tall grass. Further, by virtue of the applicant's blade, enhanced cutting effects are achieved, making it possible to both normally cut larger vegetation than otherwise possible and to mulch other relatively larger vegetation. Finally, the capability of the mower to stand up under severe cutting conditions is enhanced by elevating the engine above the housing and providing an opening through the housing which enables improved cooling of the engine.

I claim:

1. A rotay mower comprising:

a gasoline-driven rotary power source and a drive shaft extending downward therefrom;

an elongated flat mowing blade attached to said shaft having a pair of oppositely tapering pointed prongs at each longitudinal end of said blade, one prong of each said pair of prongs tapering upward at an angle of 15° to 35° with respect to the plane of said mowing blade, and the other prong of each said pair of prongs tapering downward at an angle of 15° to 35° with respect to the plane of said mowing blade, each said prong extending outward beyond its respective said longitudinal end of said mowing blade, and said blade having a portion of its bottommost edge beveled;

a housing having a top and side regions generally surrounding said mowing blade, said rotary power source being supported above said top of said housing approximately ⅛" to 1", and said housing having a first passageway therein underneath said power source, whereby a draft of air may move from under said engine downward through said passageway and under and out said housing around said mowing blade;

a plurality of wheels positioned and attached to said housing for movement of said housing along the ground in a line of direction;

a steering bar connected to said housing and extending away from said housing along a first direction along said line of direction;

said housing having an opening in one side and a portion of the adjoining top of said housing, said opening being on a side of said housing opposite to that of said steering bar;

a shield pivotally attached to said housing and configured to cover said opening;

control means, including a control cable assembly having a cable having one end coupled to said shield and an opposite end of said control cable assembly supported by said steering bar, for selectively opening and closing said shield over said opening and for maintaining said shield in either said open or said closed position; and a portal in the top of said housing and an unobstructed circular tube extending around and up from said portal, said portal being located at a radial position with respect to said shaft corresponding to a radial position of said pointed prongs of said mowing blade.

* * * * *